(No Model.)
R. EVERITT.
FLUID PRESSURE GOVERNOR.
No. 379,382.  Patented Mar. 13, 1888.
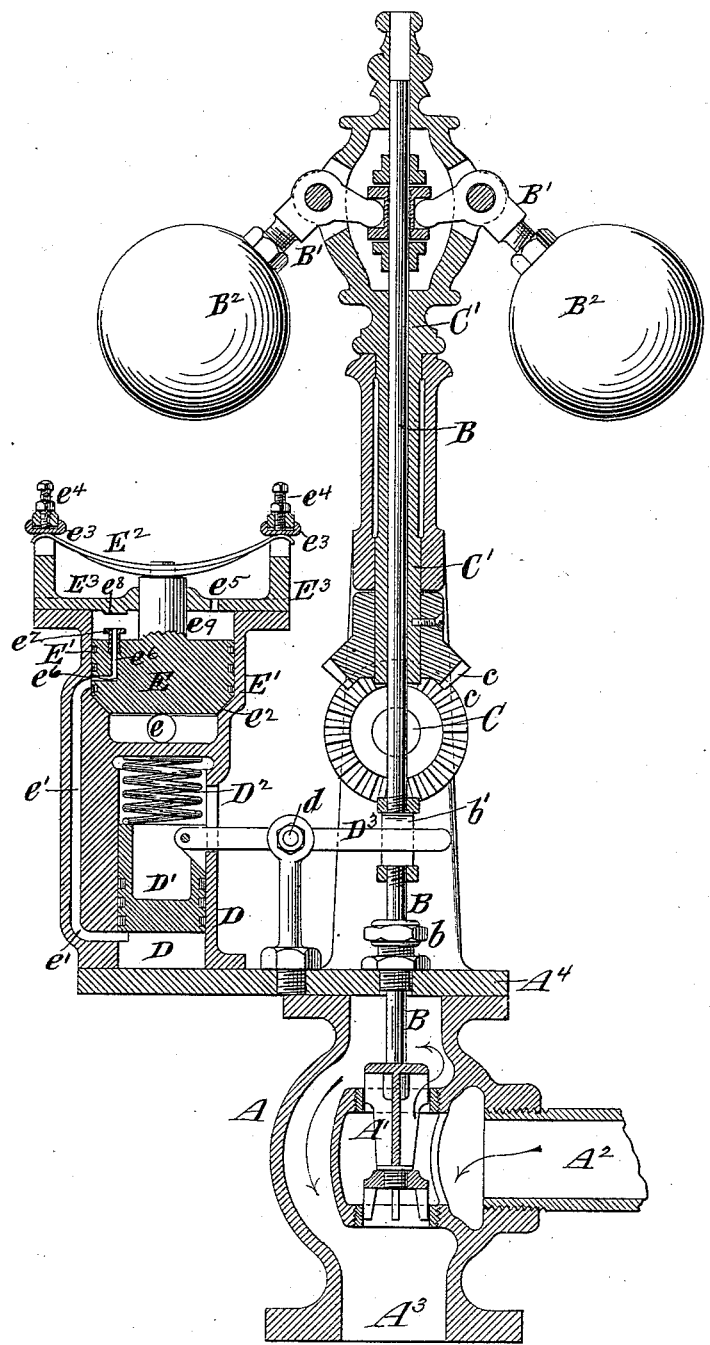
Witnesses.
Emil Herter.
C. L. Sundgren.
Inventor.
Robert Everitt
by his Atty
Brown & Hall

UNITED STATES PATENT OFFICE.

ROBERT EVERITT, OF BROOKLYN, NEW YORK.

FLUID-PRESSURE GOVERNOR.

SPECIFICATION forming part of Letters Patent No. 379,382, dated March 13, 1888.

Application filed May 12, 1887. Serial No. 237,964. (No model.)

*To all whom it may concern:*

Be it known that I, ROBERT EVERITT, of Brooklyn, in the county of Kings and State of New York, have invented a new and useful Improvement in Fluid-Pressure Governors, of which the following is a specification.

In the compression of air and the use of such compressed air for operating rock-drills and analogous machines the air is forced by a compressor into a large reservoir or receiver, from which it is taken to supply the several machines. It is of course desirable in the operation of such air-compressors and the machines driven by compressed air to maintain a uniform working-pressure of air, both so as to have sufficient pressure for properly operating the rock-drills or other machines and so as to not waste power by maintaining an excessive pressure and allowing the excessive pressure to blow off. In Letters Patent No. 315,244, granted April 7, 1885, to J. Clayton, there is shown, in combination with an ordinary speed-governor and its valve for controlling the supply of steam to an operating-engine for an air-compressor, a pressure-regulator which consists of a cylinder and piston, the cylinder being provided below the piston with an inlet for compressed air, and the piston being connected by a lever with the valve-stem of the speed-governor in such manner as to provide for the ordinary operation of the speed-governor without any interference from the regulator. In that apparatus the pressure of air acts directly upon the regulator or motor-piston, and hence this motor-piston must have a considerable movement—say from one and one-half to two inches, or thereabout—and ordinarily this motor-piston is directly loaded, so that it will not be operated by anything less than the maximum pressure, and consequently the springs or weights which are employed to load it act as a resistance to oppose its movement during the whole stroke.

The object of my invention is to relieve the motor-piston itself of any material load and so construct and combine the parts that the compressed air will not be admitted to the motor-cylinder until it reaches its maximum, and will then, the motor-piston being subjected to comparatively no resistance, serve to operate the motor-piston through its whole stroke instantaneously, and thus act more quickly upon the governor-valve spindle.

The invention is hereinafter more fully described, and pointed out in the claims.

The accompanying drawing illustrates a vertical section of a speed-governor, its valve, and a fluid-pressure governor embodying my invention and connected with the valve of the speed-governor.

A designates a casing which may be supposed to be bolted upon the steam-chest of an engine, and within which operates a valve, A', controlling the flow of fluid through the casing in the direction indicated by the arrows. The stem B of the valve, which works through a suitable stuffing-box, $b$, in the casing A, has connected with its upper end arms B', provided with governor-balls $B^2$, and as the speed of the engine may increase or diminish the balls, by their centrifugal force or by their inward movement through gravity, move the stem B in one direction or the other and open or close the valve A'.

C designates the shaft through which the governor is driven, and $c$ are gear-wheels through which that shaft transmits motion to the rotary hollow spindle C', carrying the governor-arms B', and through which passes the valve-stem B.

No further description of the speed-governor need be given, as it is of ordinary construction in its principal parts, but it will be understood that instead of my invention being combined with the speed-governor it may be combined with a simple valve serving to relieve the pressure in the air tank or receiver, or for any other purpose, and under such circumstances one branch, $A^2$, of the casing A would be connected with the receiver and the other branch, $A^3$, with the atmosphere, or vice versa.

The bonnet $A^4$ of the casing A is, in this example of the invention, extended upon one side to form a base-piece for the cylinder D, which constitutes a motor-cylinder, and which contains a motor-piston, D', above which is a slight spring, D², and which is connected by a lever, D³, with the valve stem B. The lever D³ may be fulcrumed at $d$, and its end portion engages a yoke or fork, $b'$, in the valve-stem B, or is otherwise so connected therewith that the lever may operate through said stem to close the valve A', and yet will not impede the action of the speed-governor upon that valve.

In the fluid-pressure governors heretofore used in connection with air-compressors the air tank or receiver has been connected by a pipe directly with the motor-cylinder D, but in carrying out my invention I interpose between the two a valve, E, which operates within a suitable cylinder or chamber, E', and which is loaded by a spring, E², or otherwise, to the maximum pressure desired for compressing air. The working chamber or cylinder E' is provided with an air-inlet, $e$, and is connected by a passage, $e'$, with the motor-cylinder D.

The valve E is here represented as a combined puppet and piston valve, it having a bevel-face which fits upon a corresponding seat, $e^2$, in the working-chamber E', and above said bevel-face fitting as piston within the chamber. Consequently it will be seen that as soon as the valve E is raised from its seat $e^2$ by air of the maximum pressure which is desired, a larger area of surface is presented to the action of the air, and acting more forcibly, the same pressure of air will close the valve instantly while open. The valve E and the motor-piston E' may be provided with ring-packing of any suitable character in order to prevent leakage of air past them, or they may be provided with other such packing as is ordinarily used in corresponding situations. I have here represented a top-piece or head, E³, secured upon the working chamber or cylinder E', and in opposite ends of this head are fitted saddles $e^3$, which bear on the ends of the spring E² and may be adjusted by set-screws $e^4$, so as to vary the force exerted by the spring E². Consequently the load upon the valve E may be varied as desired to counterbalance the maximum pressure of compressed air which it is desired to maintain in the reservoir.

The spring D² should not be sufficient to load the motor-piston D' to anything like the extent which will be required to balance the maximum pressure of air desired to be maintained, but it simply serves to give a quicker return of downward movement to the piston D' and as a buffer to prevent the piston from striking the top of the cylinder D when forced upward by compressed air.

The working chamber or cylinder E' for the valve E is at the top in communication with the atmosphere through suitable vent-holes, $e^5$, in the head or top piece, E³, and I have shown the valve E as constructed with a passage, $e^6$, terminating in a valve, $e^7$, opposite which is a seat, $e^8$, upon the head or top piece, E³. When the valve E is raised to its limit, the supplemental valve $e^7$ comes to a bearing upon the seat $e^8$, and the passage $e^6$ is closed or communication thereof with the atmosphere is cut off. In this example of the invention the valve E has a stem, $e^9$, which is suitably guided in the head or top piece, E³.

As shown in the drawing, the parts are in their position of rest, save that the valve A' is maintained partially open by the action of the speed-governor. In this position of parts it will be seen that the passage $e^6$ is in communication with the passage $e'$, and consequently the motor-cylinder D is in free communication with the atmosphere and no pressure remains therein. Upon the air within the receiver exceeding the maximum pressure desired, the under side of the valve E is, through the inlet $e$, subjected to corresponding pressure and the valve is lifted sufficiently for the compressed air or other fluid under pressure to pass through the passage $e'$ to the motor-cylinder D. Such air, by acting on the motor-piston D', raises the piston, and through the lever D³, acting upon the valve-stem B, more or less closes the valve A' and at the same time the movement of the valve E has raised the supplemental valve $e^7$ against the seat $e^8$, and no compressed air can escape to the atmosphere. As soon as the pressure in the receiver falls below the maximum the valve E returns to its seat, and then through the passages $e'$ $e^6$ the motor-cylinder is placed in free communication with the atmospere, and as the compressed air escapes from said motor-cylinder D the motor-piston D' returns to its normal position.

What I claim as my invention, and desire to secure by Letters Patent, is—

1. The combination, with a speed-governor and its valve, of a motor-piston, D', connected by a lever with the valve-stem and not interfering with the ordinary action of the speed-governor, a valve cylinder or chamber, E', terminating in the valve-seat $e^2$ above the motor-cylinder, communicating with the motor-cylinder below the motor-piston and having an inlet for fluid under pressure below the valve-seat, and a loaded puppet-valve working within the cylinder and fitting said seat, whereby said valve serves to control the entrance of fluid under pressure to the motor-cylinder to operate the motor-piston, substantially as herein described.

2. The combination, with the speed-governor and its valve, of a motor cylinder and piston, D D', and a connecting-lever, D³, between the piston and the valve-stem, the cylinder E', having an inlet, $e$, and a passage, $e'$, connecting it with the cylinder D, and the loaded valve E, also having a passage, $e^6$, which is in communication with the passage $e'$ when said valve is seated, whereby the cylinder D is vented to the atmosphere when the motor-piston is inactive, substantially as herein described.

3. The combination, with a speed-governor and its valve, of the motor cylinder and piston D D', the connecting-lever D³, the cylinder E', having an inlet, e, and the passage e', connecting it with the cylinder D, the loaded valve E, having the passage e⁶ terminating at the top of the piston in a valve, and a seat against which the last said valve closes when the valve is raised, substantially as herein described.

ROBERT EVERITT.

Witnesses:
   FREDK. HAYNES,
   HENRY J. MCBRIDE.